United States Patent
Moriyama et al.

(10) Patent No.: US 11,427,182 B2
(45) Date of Patent: Aug. 30, 2022

(54) CONTROL DEVICE AND CONTROL METHOD FOR HYBRID VEHICLE

(71) Applicant: TOYOTA JIDOSHA KABUSHIKI KAISHA, Toyota (JP)

(72) Inventors: Yohei Moriyama, Toyoake (JP); Shigeki Nakayama, Gotemba (JP); Ikuma Tsuzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 16/815,446

(22) Filed: Mar. 11, 2020

(65) Prior Publication Data

US 2020/0331457 A1   Oct. 22, 2020

(30) Foreign Application Priority Data

Apr. 17, 2019   (JP) .............................. JP2019-078687

(51) Int. Cl.
  *B60L 9/00*   (2019.01)
  *B60W 20/40*   (2016.01)
  (Continued)

(52) U.S. Cl.
  CPC ............ *B60W 20/40* (2013.01); *B60W 10/06* (2013.01); *B60W 10/08* (2013.01); *B60W 10/10* (2013.01);
  (Continued)

(58) Field of Classification Search
  CPC ...... B60W 10/00; B60W 10/04; B60W 10/06; B60W 10/08; B60W 10/10; B60W 20/00; B60W 20/10; B60W 20/40; B60W 2510/00; B60W 2510/06; B60W 2510/0666; B60W 2510/068; B60W 2510/08;
  (Continued)

(56) References Cited

U.S. PATENT DOCUMENTS

| 2006/0180362 A1* | 8/2006 | Yamaguchi | ............... B60K 6/20 180/65.235 |
| 2010/0045103 A1* | 2/2010 | Mitsutani | ................ H02M 1/32 307/9.1 |

(Continued)

FOREIGN PATENT DOCUMENTS

| JP | 2008-106675 A | 5/2008 |
| JP | 2017-159680 A | 9/2017 |
| WO | 2010/134163 A1 | 11/2010 |

*Primary Examiner* — Adam M Alharbi
(74) *Attorney, Agent, or Firm* — Oliff PLC (57) ABSTRACT

A control device for a hybrid vehicle is provided. When a first drive mode is selected as the drive mode of the hybrid vehicle, a control section shifts the drive mode to a second drive mode when a charge amount of a battery for an electric motor becomes smaller than or equal to a determination charge amount. The first drive mode operates the electric motor while an internal combustion engine is stopped. The second drive mode permits the operation of the internal combustion engine. The control section executes a shifting process when the upper limit system output is lower than or equal to a startup determination output even though the charge amount of the battery is greater than the determination charge amount. The shifting process shifts the drive mode to the second drive mode to start the internal combustion engine.

7 Claims, 4 Drawing Sheets (51) Int. Cl.
*B60W 10/10* (2012.01)
*B60W 10/08* (2006.01)
*B60W 20/10* (2016.01)
*B60W 10/06* (2006.01)

(52) U.S. Cl.
CPC ....... *B60W 20/10* (2013.01); *B60W 2510/068* (2013.01); *B60W 2510/0666* (2013.01); *B60W 2510/085* (2013.01); *B60W 2510/244* (2013.01)

(58) Field of Classification Search
CPC ....... B60W 2510/085; B60W 2510/24; B60W 2510/242; B60W 2510/244
See application file for complete search history.

(56) References Cited

U.S. PATENT DOCUMENTS

| | | |
|---|---|---|
| 2010/0082188 A1 | 4/2010 | Ando |
| 2012/0072063 A1 | 3/2012 | Kato et al. |
| 2014/0297088 A1* | 10/2014 | Ando .................... B60W 10/08 180/65.265 |
| 2018/0086333 A1* | 3/2018 | Oguma ................ B60W 20/20 |
| 2018/0273019 A1* | 9/2018 | Johri .................... B60W 10/08 |

\* cited by examiner

CONTROL DEVICE AND CONTROL METHOD FOR HYBRID VEHICLE

BACKGROUND

1. Field

The present disclosure relates to a control device and a control method for a hybrid vehicle. The control device and the control method control a hybrid system that includes an internal combustion engine and an electric motor as vehicle power sources.

2. Description of Related Art

Japanese Laid-Open Patent Publication No. 2008-106675 discloses an example of a control device that uses a first drive mode and a second drive mode depending on the condition. In the first drive mode, the operation of the internal combustion engine is stopped while operating the electric motor to drive the vehicle. In the second drive mode, the internal combustion engine is operated to drive the vehicle. According to such a control device, under the condition in which the first drive mode is selected as the drive mode, the charge amount of a battery for the electric motor decreases. When the charge amount becomes smaller than or equal to a determination charge amount, the drive mode is shifted to the second drive mode, so that the engine operation is started.

Immediately after the drive mode is shifted to the second drive mode, the temperature of a catalyst located in an exhaust passage of the internal combustion engine may have not reached an activation temperature range. The activation temperature range is the temperature range that allows the catalyst to sufficiently purify the exhaust gas. If the temperature of the catalyst is lower than the lower limit of the activation temperature range, a large amount of exhaust gas is discharged from the inside of the cylinders to the exhaust passage by, for example, the engine operation that increases the engine output, which is the output of the internal combustion engine. This deteriorates the properties of the exhaust gas of the vehicle.

In the device disclosed in the above publication, even after the drive mode is shifted to the second drive mode, the engine output is restricted when the temperature of the catalyst is lower than the lower limit of the activation temperature range. This inhibits increase in the amount of the exhaust gas discharged from the inside of the cylinders to the exhaust passage. Thus, when the drive mode is shifted to the second drive mode, so that the engine operation is started, the properties of the exhaust gas of the vehicle are supposed to be inhibited from deteriorating.

Under the condition in which the engine output is restricted after the engine operation is started by the shifting of the drive mode to the second drive mode, the hybrid system may sometimes be requested to provide a very high output. In this specification, the sum of the upper limit value of the engine output and the upper limit value of the motor output will be referred to as an upper limit system output. That is, the hybrid system may be requested to provide a high output that exceeds the upper limit system output, which is the sum of the upper limit value of the engine output under the condition in which the engine output is restricted and the upper limit value of the motor output. In this case, with the device disclosed in the above publication, the divergence between the requested output of the hybrid system and the actual output of the hybrid system is concerned.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A control device for a hybrid vehicle is provided. The hybrid vehicle includes a hybrid system including an internal combustion engine and an electric motor as power sources of the hybrid vehicle. The control device includes a control section, a first upper limit calculation section, a second upper limit calculation section, and a third upper limit calculation section. The control section is configured to; shift a drive mode from a first drive mode to a second drive mode when a charge amount of a battery for the electric motor becomes smaller than or equal to a determination charge amount under a condition in which the first drive mode is selected as the drive mode of the hybrid vehicle; in the first drive mode, operate the electric motor to drive the hybrid vehicle while the internal combustion engine is stopped; and in the second drive mode, drive the hybrid vehicle while permitting operation of the internal combustion engine. The first upper limit calculation section is configured to calculate an upper limit motor output, which is an upper limit of an output of the electric motor. The upper limit motor output is calculated such that the greater the charge amount of the battery is, the greater the value of the upper limit motor output becomes. The second upper limit calculation section is configured to calculate an upper limit engine output, which is an upper limit of an output of the internal combustion engine. The internal combustion engine includes an exhaust passage and a catalyst located in the exhaust passage. The upper limit engine output is calculated such that the value of the upper limit engine output is higher when a temperature of the catalyst is within an activation temperature range of the catalyst than when the temperature of the catalyst is out of the activation temperature range. The third upper limit calculation section is configured to calculate an upper limit system output, which is an upper limit of an output of the hybrid system when the first drive mode is selected. The upper limit system output is calculated such that the greater a sum of the upper limit motor output and the upper limit engine output is, the greater the value of the upper limit system output becomes. The control section is configured to execute a shifting process when the upper limit system output is lower than or equal to a startup determination output even under a condition in which the charge amount of the battery is greater than the determination charge amount. The shifting process shifts the drive mode to the second drive mode to start the internal combustion engine.

When the charge amount of the battery for the electric motor becomes smaller than or equal to the determination charge amount during the execution of the driving control of the vehicle in the first drive mode, the drive mode is shifted to the second drive mode, so that the engine operation is started.

According to the above configuration, under the condition in which the first drive mode is selected, the upper limit motor output and the upper limit engine output are calculated, and the upper limit system output is calculated based on the upper limit motor output and the upper limit engine output. As the charge amount of the battery is decreased, the upper limit motor output is decreased. The upper limit engine output is lower when the catalyst temperature is out of the activation temperature range than when, for example, the catalyst temperature is within the activation temperature range. The upper limit system output is high since the upper limit motor output is high when the charge amount is great even if the first drive mode is selected and the catalyst temperature is out of the activation temperature range. Thus, when the charge amount is great, the divergence between the requested output of the hybrid system and the actual output of the hybrid system is inhibited.

Since the upper limit motor output is decreased when the charge amount is decreased, the upper limit system output is also decreased. Thus, when the first drive mode is selected, and the catalyst temperature is out of the activation temperature range, the upper limit system output is more likely to become lower than the requested output of the hybrid system as the charge amount is decreased.

According to the above configuration, the drive mode is shifted to the second drive mode by the execution of the shifting process when the upper limit system output is lower than or equal to the startup determination output even under the condition in which the charge amount is greater than the determination charge amount. That is, the engine operation is started before the charge amount becomes smaller than or equal to the determination charge amount. As above, at the point in time when the engine operation is started, the charge amount is relatively great. Thus, at that point in time, the upper limit motor output is still high. Consequently, the requested output of the hybrid system is still inhibited from exceeding the upper limit system output. As a result, the high output that exceeds the upper limit engine output is inhibited from being requested from the internal combustion engine. This inhibits the deterioration in the properties of the exhaust gas even if the catalyst temperature is out of the activation temperature range. Thus, when the drive mode is shifted to the second drive mode, inhibiting the properties of the exhaust gas from deteriorating and inhibiting the divergence between the requested output of the hybrid system and the actual output of the hybrid system are compatible.

Example 2: When the hybrid vehicle described in the above aspect includes a catalyst heating section, which is configured to increase the temperature of the catalyst, the control section may be configured to: execute a catalyst temperature increase process when the upper limit system output becomes lower than or equal to the startup determination output under the condition in which the charge amount of the battery is greater than the determination charge amount, wherein the catalyst temperature increase process increases the temperature of the catalyst by operating the catalyst heating section; and execute the shifting process when the upper limit system output becomes lower than or equal to the startup determination output even though the catalyst temperature increase process is executed.

According to the above configuration, the catalyst temperature is increased without starting the engine operation by executing the catalyst temperature increase process. Increasing the upper limit engine output by increasing the catalyst temperature enables making the upper limit system output to be higher than the startup determination output. Even in this case, when the upper limit motor output is decreased due to decrease in the charge amount, the upper limit system output becomes lower than or equal to the startup determination output again. Thus, the engine operation is started by the execution of the shifting process. That is, according to the above configuration, starting of the engine operation is delayed by increasing the upper limit engine output by execution of the catalyst temperature increase process. In other words, the vehicle is allowed to keep running in the first drive mode, which limits the deterioration in the fuel efficiency of the internal combustion engine.

Furthermore, the lower the temperature of the cylinder block and the cylinder head constituting the internal combustion engine is, the more likely it is that there will be a greater amount of the unburnt fuel contained in the exhaust gas discharged from the cylinders of the internal combustion engine to the exhaust passage. The lower the temperature of the liquid that circulates in the internal combustion engine is, the lower the temperature of the cylinder block and the cylinder head becomes. Thus, as Example 3, in the control device for a hybrid vehicle as described in the above aspects, the second upper limit calculation section may be configured to increase the upper limit engine output as a temperature of liquid that circulates in the internal combustion engine is increased.

According to the above configuration, the upper limit engine output is decreased as the temperature of the liquid is decreased. Since the upper limit system output is decreased as the upper limit engine output is decreased, the upper limit system output becomes lower than or equal to the startup determination output at an earlier stage accordingly. That is, the shifting process is executed at an early stage. That is, the engine operation is started at an early stage. This limits an output that exceeds the upper limit engine output from being requested from the internal combustion engine and limits the deterioration in the properties of the exhaust gas.

Example 4: When the hybrid vehicle as described in the above aspect includes an engine heating section, which is configured to increase the temperature of the liquid that circulates in the internal combustion engine, the control section may be configured to: execute an engine temperature increase process when the upper limit system output becomes lower than or equal to the startup determination output under the condition in which the charge amount of the battery is greater than the determination charge amount, wherein the engine temperature increase process increases the temperature of the liquid by operating the engine heating section; and execute the shifting process when the upper limit system output becomes lower than or equal to the startup determination output even though the engine temperature increase process is executed.

According to the above configuration, the temperature of the liquid that circulates in the internal combustion engine, that is the temperature of the cylinder block and the cylinder head, is increased without starting the engine operation by executing the engine temperature increase process. Increasing the upper limit engine output by increasing the temperature of the cylinder block and the cylinder head enables making the upper limit system output to be higher than the startup determination output. In this case also, when the upper limit motor output is decreased due to a decrease in the charge amount, the upper limit system output becomes lower than or equal to the startup determination output again. The engine operation is then started by the execution of the shifting process. That is, according to the above configuration, starting of the engine operation is delayed by increasing the upper limit engine output by the execution of the engine temperature increase process. That is, the vehicle is allowed to keep running in the first drive mode, which limits the deterioration in the fuel efficiency of the internal combustion engine.

Example 5: In the control device as described in the above aspects, the first upper limit calculation section may be configured to calculate the upper limit motor output based on a temperature of the battery and a temperature of an inverter circuit for the electric motor in addition to the charge amount, and the first upper limit calculation section may be configured to increase the upper limit motor output as the temperature of the battery is increased, and to increase the upper limit motor output as the temperature of the inverter circuit is increased.

The first upper limit calculation section calculates the upper limit motor output based on the temperature of the battery and the temperature of the inverter circuit for the electric motor in addition to the charge amount. The higher the temperature of the battery is, the lower the internal resistance of the battery becomes. Thus, the upper limit motor output is increased as the temperature of the battery is increased. The higher the temperature of the inverter circuit is, the lower becomes the electric resistivity of a switching element made of a semiconductor constituting the inverter circuit. Thus, the upper limit motor output should be increased as the temperature of the inverter circuit is increased.

Example 6: A control method for a hybrid system is provided that performs the various processes as described in the above aspects.

Example 7: A non-transitory computer readable memory medium is provided that stores a program that causes a processor to perform the various processes as described in the aspects.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A control device 80 for a hybrid vehicle according to a first embodiment of the present disclosure will be described with reference to FIGS. 1 to 5.

Figure 1:
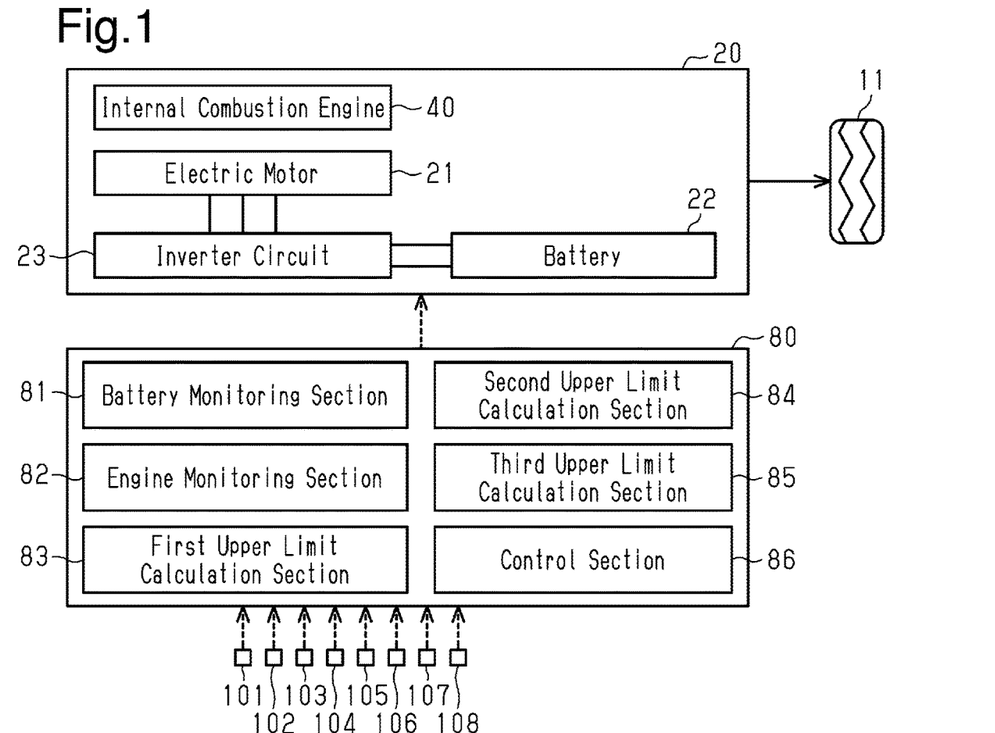
FIG. 1 is a diagram illustrating the functional configuration of a control device for a hybrid vehicle according to a first embodiment of the present disclosure and the schematic configuration of a hybrid system controlled by the control device.

FIG. 1 shows the control device 80 of the present embodiment and a hybrid system 20 controlled by the control device 80. A vehicle equipped with the hybrid system 20 is a plug-in hybrid vehicle that allows a battery 22 to be charged by a power supply from outside the vehicle.

The hybrid system 20 includes an electric motor 21 and an internal combustion engine 40 as power sources of the vehicle. That is, the hybrid system 20 is capable of both inputting the output torque of the electric motor 21 to wheels 11 and inputting the output torque of the internal combustion engine 40 to the wheels 11. To cause the electric motor 21 to function as a power source of the vehicle, a direct-current voltage of the battery 22 is converted to an alternating-current voltage by an inverter circuit 23, and the alternating-current voltage is input to the electric motor 21. The battery 22 may be, for example, a nickel-hydrogen battery and a lithium-ion battery.

Figure 2:
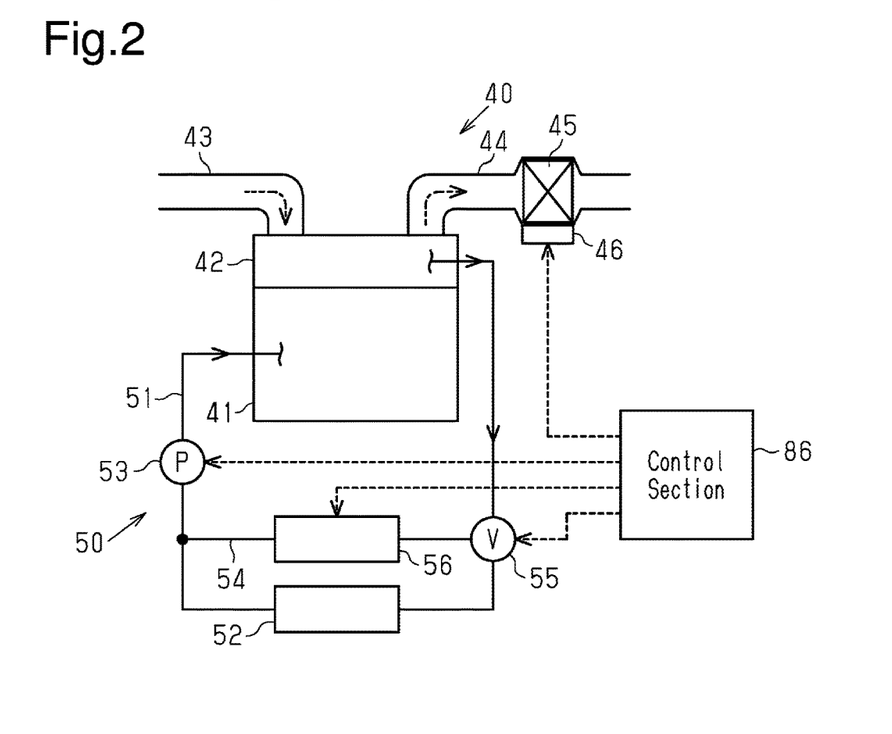
FIG. 2 is a schematic diagram illustrating the flow of coolant that circulates in an internal combustion engine constituting the hybrid system in the hybrid vehicle of FIG. 1.

As shown in FIG. 2, the internal combustion engine 40 includes a cylinder block 41 and a cylinder head 42 mounted on the cylinder block 41. Intake air is introduced into the cylinders formed in the cylinder block 41 through an intake passage 43 as shown by a broken arrow in FIG. 2. The exhaust gas generated in the cylinders is discharged to an exhaust passage 44 as shown by a broken arrow in FIG. 2.

A catalyst 45 of an exhaust purifying device is located in the exhaust passage 44. The catalyst 45 functions to store the oxygen and to oxidize the unburnt fuel. The catalyst 45 may be, for example, a three-way catalyst. If a catalyst temperature TPCa, which is the temperature of the catalyst 45, is within a predetermined activation temperature range ATPCa, the catalyst 45 functions to oxidize the unburnt fuel contained in the exhaust gas, or to purify the exhaust gas.

In the present embodiment, the internal combustion engine 40 includes a catalyst heating section 46, which increases the temperature of the catalyst 45. The catalyst heating section 46 may be, for example, a heater. In this case, heating the catalyst 45 by the catalyst heating section 46 increases the catalyst temperature TPCa, which is the temperature of the catalyst 45.

Coolant, which is an example of liquid, circulates in the internal combustion engine 40. FIG. 2 shows a circulation device 50 for the coolant in the internal combustion engine 40. The circulation device 50 includes a coolant circuit 51. The coolant that flows through the cylinder block 41 and the cylinder head 42 circulates through the coolant circuit 51. The coolant circuit 51 includes a radiator 52, which cools the coolant that has flowed out from the water jacket of the cylinder head 42, and a coolant pump 53, which discharges the coolant that has passed through the radiator 52 toward the water jacket in the cylinder block 41. The coolant circuit 51 also includes a bypass passage 54, which bypasses the radiator 52. Furthermore, the coolant circuit 51 includes a direction control valve 55, which controls the flow direction of the coolant that flowed out from the inside of the cylinder head 42. The coolant is introduced to the radiator 52 or to the bypass passage 54 instead of the radiator 52 depending on the operation of the direction control valve 55. If the inflow of the coolant to the radiator 52 is restricted by the operation of the direction control valve 55, the coolant that has flowed out from the inside of the cylinder head 42 is introduced to the coolant pump 53 through the bypass passage 54.

In the present embodiment, the bypass passage 54 includes an engine heating section 56. The engine heating section 56 increases a coolant temperature TPWt, which is the temperature of the coolant. The engine heating section 56 may be, for example, a heater. In this case, the coolant that flows through the bypass passage 54 is heated by the engine heating section 56, so that the coolant temperature TPWt is increased. When the coolant heated in this manner circulates through the coolant circuit 51, the temperature of the cylinder block 41 and the cylinder head 42 is increased.

The liquid that circulates in the internal combustion engine 40 may be oil besides the coolant. The oil is stored in an oil pan. When the oil in the oil pan is pumped up by an oil pump, the oil flows through the internal combustion engine 40 and back to the inside of the oil pan.

Next, the control device 80 will be described with reference to FIG. 1.

The control device 80 receives detection signals from various sensors. The sensors may be, for example, a battery voltage sensor 101, a battery current sensor 102, a battery temperature sensor 103, an inverter temperature sensor 104, a coolant temperature sensor 105, an oil temperature sensor 106, an air flow meter 107, and an air-fuel ratio sensor 108. The battery voltage sensor 101 detects a battery voltage VBt, which is the voltage of the battery 22, and outputs a signal corresponding to the battery voltage VBt as a detection signal. The battery current sensor 102 detects a battery current IBt, which is the current of the battery 22, and outputs a signal corresponding to the battery current IBt as a detection signal. The battery temperature sensor 103 detects a battery temperature TPBt, which is the temperature of the battery 22, and outputs a signal corresponding to the battery temperature TPBt as a detection signal. The inverter temperature sensor 104 detects an inverter temperature TPIn, which is the temperature of the inverter circuit 23, and outputs a signal corresponding to the inverter temperature TPIn as a detection signal. The coolant temperature sensor 105 detects the coolant temperature TPWt and outputs a signal corresponding to the coolant temperature TPWt as a detection signal. The oil temperature sensor 106 detects an oil temperature TPOI, which is the temperature of the oil that circulates in the internal combustion engine 40, and outputs a signal corresponding to the oil temperature TPOI as a detection signal. The air flow meter 107 detects an intake air amount GA, which is the amount of the intake air that flows through the intake passage 43, and outputs a signal corresponding to the intake air amount GA as a detection signal.

The air-fuel ratio sensor 108 detects an air-fuel ratio Af based on the exhaust gas that flows through the exhaust passage 44 and outputs a signal corresponding to the air-fuel ratio Af as a detection signal. The control device 80 controls the hybrid system 20 based on the detection signals from the various sensors 101 to 108.

The control device 80 includes a battery monitoring section 81, an engine monitoring section 82, a first upper limit calculation section 83, a second upper limit calculation section 84, a third upper limit calculation section 85, and a control section 86 as functional units for controlling the hybrid system 20.

The battery monitoring section 81 monitors the state of the battery 22. The state of the battery 22 includes, for example, the battery temperature TPBt, a charge amount SBt of the battery 22, and a degradation degree DBt of the battery 22. The charge amount SBt is calculated based on the battery temperature TPBt, the battery voltage VBt, and the battery current IBt. The degradation degree DBt of the battery 22 is estimated based on the fluctuation amount of the battery temperature TPBt, the number of repetitions of increase and decrease of the charge amount SBt, and the fluctuation amount of the charge amount SBt.

The battery monitoring section 81 also monitors the inverter temperature TPIn.

The engine monitoring section 82 monitors the coolant temperature TPWt, the oil temperature TPOI, a temperature TPCy of the combustion chambers in the cylinders, and a wall temperature TPPo of the intake ports. The temperature TPCy of the combustion chambers is calculated based on the coolant temperature TPWt, the oil temperature TPOI, the intake air amount GA, and the fuel injection amount of the fuel injection valves of the internal combustion engine. The wall temperature TPPo of the intake ports is calculated based on the coolant temperature TPWt, the oil temperature TPOI, and the intake air amount GA.

The engine monitoring section 82 also monitors the catalyst temperature TPCa, an oxygen storage amount QOx of the catalyst 45, and a sulfur poisoning amount QSu of the catalyst 45. The oxygen storage amount QOx of the catalyst 45 is calculated based on the fuel injection amount of each fuel injection valve and the air-fuel ratio Af when the engine is in operation. When the engine is not in operation, for example, the value at the point in time when the previous engine operation is terminated is maintained as the oxygen storage amount QOx. When the engine is in operation, the sulfur poisoning amount QSu of the catalyst 45 is calculated based on the fuel injection amount of each fuel injection valve. When the engine is not in operation, for example, the value at the point in time when the previous engine operation is terminated is maintained as the sulfur poisoning amount QSu.

The control section 86 selects the drive mode of the vehicle and controls the hybrid system 20 in the manner corresponding to the selected result. The drive mode includes a first drive mode and a second drive mode. In the first drive mode, the electric motor 21 is operated to drive the vehicle after the engine operation is stopped, so that the vehicle runs by only a motor output PM, which is the output from the electric motor 21. In the second drive mode, the engine operation is permitted to drive the vehicle, so that the vehicle runs by at least one of an engine output PE, which is the output from the internal combustion engine 40, and the motor output PM. That is, the first drive mode may also be referred to as the EV mode, and the second drive mode may also be referred to as the HV mode.

When the charge amount SBt calculated by the battery monitoring section 81 is smaller than or equal to a determination charge amount SBtTh, the control section 86 selects the second drive mode as the vehicle drive mode. When the charge amount SBt is greater than the determination charge amount SBtTh, the control section 86 may select either the first drive mode or the second drive mode as the drive mode. The selecting process of the drive mode when the charge amount SBt is greater than the determination charge amount SBtTh will be discussed below.

When the first drive mode is selected, the control section 86 controls the electric motor 21 such that the motor output PM becomes equal to a requested output PRq of the hybrid system 20. When the second drive mode is selected, the control section 86 controls the internal combustion engine 40 and the electric motor 21 such that the sum of the engine output PE and the motor output PM becomes equal to the requested output PRq. When the second drive mode is selected, the requested value of the engine output PE sometimes becomes equal to the requested output PRq. In this case, the control section 86 stops operating the electric motor 21 and operates the internal combustion engine 40. The requested value of the motor output PM also sometimes becomes equal to the requested output PRq. In this case, the control section 86 stops operating the engine and operates the electric motor 21. The process executed by the control section 86 when the second drive mode is selected under the condition in which the charge amount SBt is greater than the determination charge amount SBtTh will be discussed below.

Figure 3:
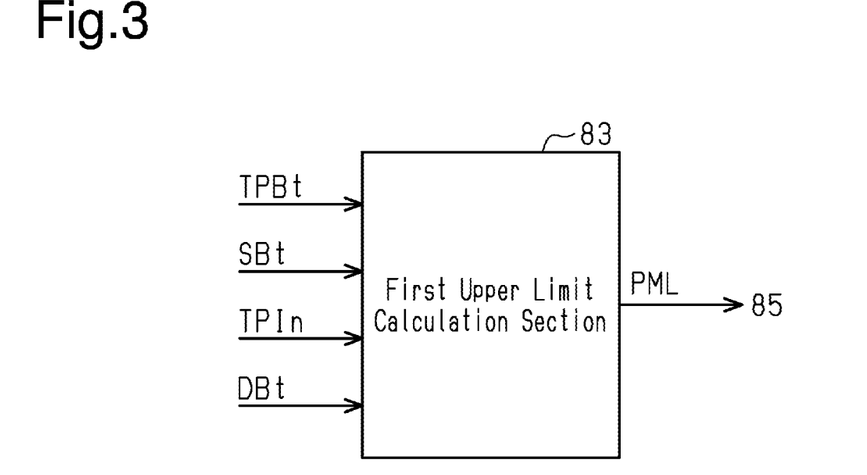
FIG. 3 is a block diagram illustrating the process executed by a first upper limit calculation section of the control device in the hybrid vehicle of FIG. 1.

The first upper limit calculation section 83 calculates an upper limit motor output PML, which is the upper limit of the motor output PM at that time. As shown in FIG. 3, the first upper limit calculation section 83 calculates the upper limit motor output PML based on the battery temperature TPBt, the charge amount SBt of the battery 22, the inverter temperature TPIn, and the degradation degree DBt of the battery 22. The higher the battery temperature TPBt is, the higher the upper limit motor output PML becomes. The greater the charge amount SBt is, the higher the upper limit motor output PML becomes. The higher the inverter temperature TPIn is, the higher the upper limit motor output PML becomes. The lower the degradation degree DBt of the battery 22 is, the higher the upper limit motor output PML becomes.

Figure 4:
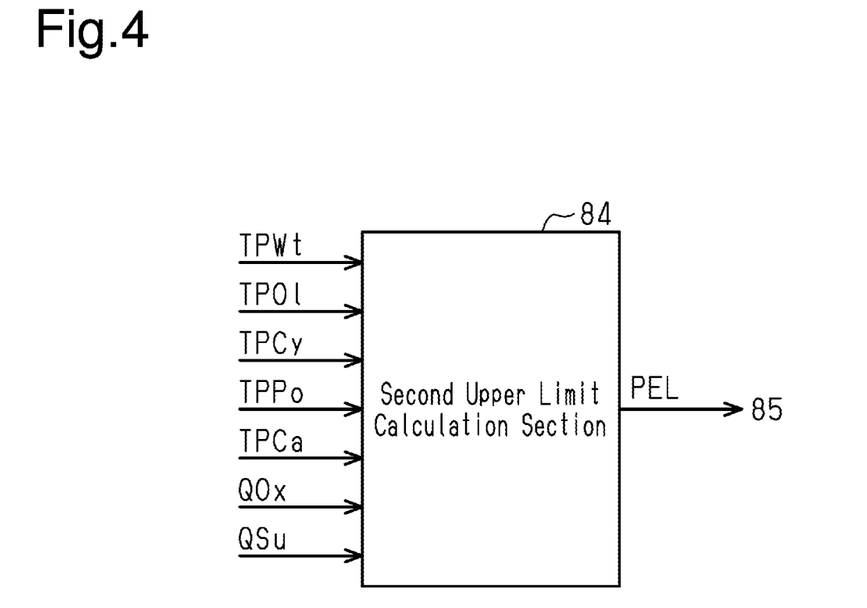
FIG. 4 is a block diagram illustrating the process executed by a second upper limit calculation section of the control device in the hybrid vehicle of FIG. 1.

As shown in FIG. 4, the second upper limit calculation section 84 calculates an upper limit engine output PEL, which is the upper limit of the engine output at that time. The second upper limit calculation section 84 calculates the upper limit engine output PEL based on the coolant temperature TPWt, the oil temperature TPOl, the temperature TPCy of the combustion chambers, the wall temperature TPPo of the intake ports, the catalyst temperature TPCa, the oxygen storage amount QOx of the catalyst 45, and the sulfur poisoning amount QSu of the catalyst 45.

As used herein, the upper limit engine output PEL refers to the upper limit of the engine output that keeps the properties of the exhaust gas discharged from the vehicle within a permissible range. When warming up of the internal combustion engine 40 is completed, the properties of the exhaust gas are less likely to deteriorate compared with the case in which warming up is not completed. Thus, the upper limit engine output PEL is higher when it can be determined that warming up is completed than when it cannot be determined that warming up is completed. Whether warming up is completed is determined based on, for example, the coolant temperature TPWt, the oil temperature TPOl, the temperature TPCy of the combustion chambers, the wall temperature TPPo of the intake ports, and the catalyst temperature TPCa.

The higher the coolant temperature TPWt is, the higher the upper limit engine output PEL becomes. The higher the oil temperature TPOl is, the higher the upper limit engine output PEL becomes. The higher the temperature TPCy of the combustion chambers is, the higher the upper limit engine output PEL becomes. The higher the wall temperature TPPo of the intake ports is, the higher the upper limit engine output PEL becomes.

The upper limit engine output PEL is higher when the catalyst temperature TPCa is within the activation temperature range ATPCa than when the catalyst temperature TPCa is out of the activation temperature range ATPCa. The upper limit engine output PEL is higher when the oxygen storage amount QOx is greater than or equal to a determination oxygen storage amount QOxTh than when the oxygen storage amount QOx is smaller than the determination oxygen storage amount QOxTh. When the oxygen storage amount QOx of the catalyst 45 is smaller than the determination oxygen storage amount QOxTh, it is determined that the catalyst 45 is not storing much oxygen. In this case, even if the catalyst temperature TPCa is within the activation temperature range ATPCa, the catalyst 45 cannot effectively purify the exhaust gas. Thus, the upper limit engine output PEL is lower when the oxygen storage amount QOx is smaller than the determination oxygen storage amount QOxTh than when the oxygen storage amount QOx is greater than or equal to the determination oxygen storage amount QOxTh.

The upper limit engine output PEL is lower when the sulfur poisoning amount QSu is greater than or equal to a determination sulfur poisoning amount QSuTh than when the sulfur poisoning amount QSu is smaller than the determination sulfur poisoning amount QSuTh. When the sulfur poisoning amount QSu of the catalyst 45 is greater than or equal to the determination sulfur poisoning amount QSuTh, it is determined that the degree of sulfur poisoning of the catalyst 45 is excessive. In this case, even if the catalyst temperature TPCa is within the activation temperature range ATPCa, the catalyst 45 cannot effectively purify the exhaust gas. Thus, the upper limit engine output PEL is lower when the sulfur poisoning amount QSu is greater than or equal to the determination sulfur poisoning amount QSuTh than when the sulfur poisoning amount QSu is smaller than the determination sulfur poisoning amount QSuTh.

The third upper limit calculation section 85 calculates an upper limit system output PSL such that the upper limit system output PSL is increased as the sum of the upper limit motor output PML, which is calculated by the first upper limit calculation section 83, and the upper limit engine output PEL, which is calculated by the second upper limit calculation section 84, is increased. In the present embodiment, the third upper limit calculation section 85 calculates the sum of the upper limit motor output PML and the upper limit engine output PEL as the upper limit system output PSL. The upper limit system output PSL corresponds to the upper limit of the output of the hybrid system 20 at the current point in time.

The routine executed by the control section 86 when the first drive mode is selected will now be described with reference to FIG. 5. This routine is repeatedly executed when the first drive mode is selected as the drive mode.

In this routine, at step S11, it is determined whether the charge amount SBt is smaller than or equal to the determination charge amount SBtTh. When the charge amount SBt is smaller than or equal to the determination charge amount SBtTh (S11: YES), the present routine is terminated. In this case, the drive mode is shifted to the second drive mode when the charge amount SBt becomes smaller than or equal to the determination charge amount SBtTh. That is, the engine operation is started.

At step S11, when the charge amount SBt is greater than the determination charge amount SBtTh (S11: NO), the process proceeds to the next step S12. At step S12, the upper limit system output PSL calculated by the third upper limit calculation section 85 is acquired. The acquired upper limit system output PSL is equal to the sum of the latest value of the upper limit motor output PML and the latest value of the upper limit engine output PEL.

At the next step S14, it is determined whether the upper limit system output PSL acquired at step S12 is lower than or equal to a startup determination output PSLTh. When the upper limit system output PSL is higher than the startup determination output PSLTh, the charge amount SBt of the battery 22 is great, and the upper limit motor output PML is high. Thus, it is determined that the requested output PRq of the hybrid system 20 will not exceed the upper limit system output PSL. When the upper limit system output PSL is lower than or equal to the startup determination output PSLTh, the upper limit motor output PML has decreased due to a decrease in the charge amount SBt of the battery 22. Thus, the requested output PRq may possibly exceed the upper limit system output PSL.

Thus, at step S14, when the upper limit system output PSL is higher than the startup determination output PSLTh (S14: NO), this routine is temporarily suspended. In this case, the first drive mode continues to be selected as the drive mode. When the upper limit system output PSL is lower than or equal to the startup determination output PSLTh (S14: YES), the process proceeds to the next step S15. At step S15, it is determined whether a history flag FLG of the temperature increase process is set to ON. The temperature increase process, which will be discussed in more detail below, is a process that increases the temperature of the cylinder block 41 and the cylinder head 42 of the internal combustion engine 40 or that increases the catalyst temperature TPCa. The upper limit engine output PEL is increased by increasing the temperature of the cylinder block 41 and the cylinder head 42 or by increasing the catalyst temperature TPCa as above. During the execution of the temperature increase process, when the upper limit engine output PEL is increased by the execution of the temperature increase process, the history flag FLG is set to ON. Even during the execution of the temperature increase process, if the upper limit engine output PEL has not increased yet, the history flag FLG is set to OFF. If the temperature increase process is not executed, the history flag FLG is set to OFF.

If the history flag FLG is set to OFF (S15: NO), the process proceeds to the next step S16. At step S16, the temperature increase process is executed. In the present embodiment, a catalyst temperature increase process and an engine temperature increase process are executed as the temperature increase processes. The catalyst temperature increase process is a process that increases the temperature of the catalyst 45 by operating the catalyst heating section 46. The engine temperature increase process is a process that increases the temperature of the liquid that circulates in the internal combustion engine 40 by operating the engine heating section 56. In the engine temperature increase process, the control section 86 operates the direction control valve 55, so that the coolant is introduced to the bypass passage 54, in which the engine heating section 56 is located, and further operates the coolant pump 53. This causes the coolant heated by the engine heating section 56 to be introduced to the cylinder block 41 and the cylinder head 42. As a result, in addition to the coolant temperature TPWt, the temperature of the cylinder block 41 and the cylinder head 42 is increased. That is, the temperature TPCy of the combustion chambers and the wall temperature TPPo of the intake ports are also increased. Subsequently, this routine is temporarily suspended.

At step S15, if the history flag FLG is set to ON (S15: YES), the process proceeds to the next step S18. At step S18, the shifting process that starts the internal combustion engine 40 is executed by shifting the drive mode from the first drive mode to the second drive mode. When the engine operation is started in this manner, the process proceeds to the next step S19. At step S19, the temperature increase process is terminated. That is, the catalyst temperature increase process and the engine temperature increase process are terminated. Subsequently, this routine is terminated. The history flag FLG is reset to OFF when the trip of the current traveling of the vehicle is terminated.

The operation and the advantages of the present embodiment will now be described.

(1) The shifting process is executed when the upper limit system output PSL is lower than or equal to the startup determination output PSLTh. This allows the drive mode to be shifted to the second drive mode even if, for example, the charge amount SBt is greater than the determination charge amount SBtTh. That is, the engine operation is started before the charge amount SBt becomes smaller than or equal to the determination charge amount SBtTh. At the point in time when the engine operation is started in this manner, the charge amount SBt is relatively great. Since the upper limit motor output PML is still high at this point in time, the requested output PRq of the hybrid system 20 is still inhibited from exceeding the upper limit system output PSL. As a result, the output that exceeds the upper limit engine output PEL is not requested from the internal combustion engine 40. Even if the catalyst temperature TPCa is out of the activation temperature range ATPCa, the properties of the exhaust gas are inhibited from deteriorating. Thus, when the drive mode is shifted to the second drive mode, inhibiting the properties of the exhaust gas from deteriorating and inhibiting the divergence between the requested output PRq and the actual system output PS of the hybrid system 20 are compatible.

Warming up of the internal combustion engine 40 and warming up of the catalyst 45 are completed during the time period from when the drive mode is shifted to the second drive mode to when the charge amount SBt becomes smaller than or equal to the determination charge amount SBtTh.

(2) The lower the temperature of the coolant or the oil circulating inside the internal combustion engine 40 is, the greater the amount of unburnt fuel contained in the exhaust gas discharged from the cylinders to the exhaust passage is likely to be. Thus, the upper limit engine output PEL is decreased. If the upper limit engine output PEL is decreased as above, the upper limit system output PSL is decreased and becomes lower than or equal to the startup determination output PSLTh at an earlier stage accordingly, and the shifting process is executed. As a result, the engine operation is started at an early stage. This inhibits the output that exceeds the upper limit engine output PEL from being requested from the internal combustion engine 40 and inhibits the deterioration in the properties of the exhaust gas.

(3) In the present embodiment, when the upper limit system output PSL becomes lower than or equal to the startup determination output PSLTh, the catalyst temperature increase process is executed. The catalyst temperature TPCa is increased without starting the engine operation by executing the catalyst temperature increase process. The upper limit engine output PEL is higher when the catalyst temperature TPCa is within the activation temperature range ATPCa than when the catalyst temperature TPCa is lower than the lower limit of the activation temperature range ATPCa. Thus, the upper limit engine output PEL and the upper limit system output PSL are increased by increasing the catalyst temperature TPCa as above. When the upper limit system output PSL becomes higher than the startup determination output PSLTh by executing the catalyst temperature increase process, the shifting process is not executed until the upper limit system output PSL becomes lower than or equal to the startup determination output PSLTh again. That is, starting of the engine operation caused by the execution of the shifting process is delayed. This limits the deterioration in the fuel efficiency of the internal combustion engine 40 caused by starting the engine operation before the charge amount SBt becomes smaller than or equal to the determination charge amount SBtTh.

However, even if the upper limit system output PSL becomes higher than the startup determination output PSLTh by the execution of the catalyst temperature increase process, the upper limit system output PSL becomes lower than or equal to the startup determination output PSLTh again due to, for example, decrease in the upper limit motor output PML. The drive mode is then shifted to the second drive mode by the execution of the shifting process, so that the engine operation is started.

(4) In the present embodiment, when the upper limit system output PSL becomes lower than or equal to the startup determination output PSLTh, the engine temperature increase process is executed. When the engine temperature increase process is executed, the coolant that is heated by the engine heating section 56 circulates in the internal combustion engine 40. Thus, the temperature of the cylinder block 41 and the cylinder head 42 is increased even without starting the engine operation. This increases the oil temperature TPOI, the temperature TPCy of the combustion chambers, and the wall temperature TPPo of the intake ports. Thus, the upper limit engine output PEL and the upper limit system output PSL are increased. When the upper limit system output PSL becomes higher than the startup determination output PSLTh, the shifting process is not executed until the upper limit system output PSL becomes lower than or equal to the startup determination output PSLTh again. That is, starting of the engine operation caused by the execution of the shifting process is delayed. This limits the deterioration in the fuel efficiency of the internal combustion engine 40 caused by starting the engine operation before the charge amount SBt becomes lower than or equal to the determination charge amount SBtTh.

However, even if the upper limit system output PSL becomes higher than the startup determination output PSLTh by the execution of the engine temperature increase process, the upper limit system output PSL becomes lower than or equal to the startup determination output PSLTh again due to, for example, decrease in the upper limit motor output PML. The drive mode is then shifted to the second drive mode by the execution of the shifting process, so that the engine operation is started.

Second Embodiment

A control device for a hybrid vehicle according to a second embodiment of the present disclosure will now be described with reference to FIG. 6. In the second embodiment, the structure of the engine heating section differs from that of the first embodiment. The differences between the first embodiment and the second embodiment will mainly be discussed in the following description. The same or equivalent components as the first embodiment are given the same reference numerals, and redundant descriptions will be omitted.

Figure 6:
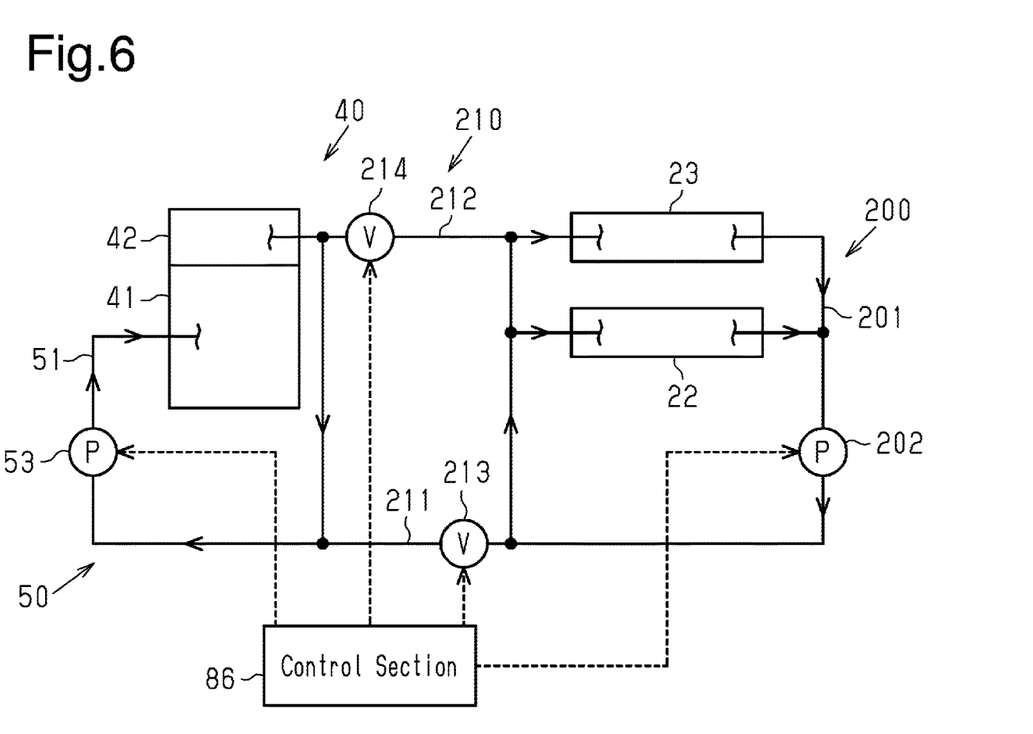
FIG. 6 is a schematic diagram illustrating the flow of the coolant that circulates in the internal combustion engine and the flow of the coolant that cools a battery and an inverter circuit in the hybrid system controlled by a control device according to a second embodiment of the present disclosure.

FIG. 6 illustrates the coolant circulation device 50 for the internal combustion engine 40 and a motor cooling device 200. The motor cooling device 200 is a device that circulates the coolant to cool the battery 22 and the inverter circuit 23. The motor cooling device 200 includes a motor coolant circuit 201 and a motor coolant pump 202, which is operated to circulate the coolant in the motor coolant circuit 201 as shown by the arrows in FIG. 6.

In the present embodiment, the motor coolant circuit 201 can be connected to the coolant circuit 51 of the circulation device 50 through a connecting device 210. The connecting device 210 includes a first connection passage 211 and a second connection passage 212. The first connection passage 211 and the second connection passage 212 are connection passages connected to both the motor coolant circuit 201 and the coolant circuit 51. The first connection passage 211 is connected to the motor coolant circuit 201 at the channel to which the outlet port of the motor coolant pump 202 is connected. The second connection passage 212 is connected to the motor coolant circuit 201 at the channel to which the inlet port of the motor coolant pump 202 is connected.

The first connection passage 211 is provided with a first shut-off valve 213, and the second connection passage 212 is provided with a second shut-off valve 214. When the first shut-off valve 213 is closed, the connection between the motor coolant circuit 201 and the coolant circuit 51 through the first connection passage 211 is blocked. When the first shut-off valve 213 is open, the motor coolant circuit 201 and the coolant circuit 51 are continuous with each other through the first connection passage 211. Similarly, when the second shut-off valve 214 is closed, the connection between the motor coolant circuit 201 and the coolant circuit 51 through the second connection passage 212 is blocked. When the second shut-off valve 214 is open, the motor coolant circuit 201 and the coolant circuit 51 are continuous with each other through the second connection passage 212. Thus, when the motor coolant pump 202 is operated with the shut-off valves 213 and 214 open, the coolant in the motor coolant circuit 201 is allowed to flow into the coolant circuit 51 through the first connection passage 211. Additionally, the coolant in the coolant circuit 51 is allowed to flow out to the motor coolant circuit 201 through the second connection passage 212.

When the electric motor 21 is operated, the temperature of the coolant in the motor coolant circuit 201 converges in a first temperature range. Under the condition in which the first drive mode is selected, the coolant temperature TPWt, which is the temperature of the coolant in the coolant circuit 51, is lower than the lower limit of the first temperature range. Thus, by allowing the coolant in the motor coolant circuit 201 to flow into the coolant circuit 51 as described above, the coolant temperature TPWt, which is the temperature of the coolant in the coolant circuit 51, is increased. Consequently, the temperature of the cylinder block 41 and the cylinder head 42 is increased. That is, in the present embodiment, the connecting device 210 functions as the engine heating section.

Figure 5:
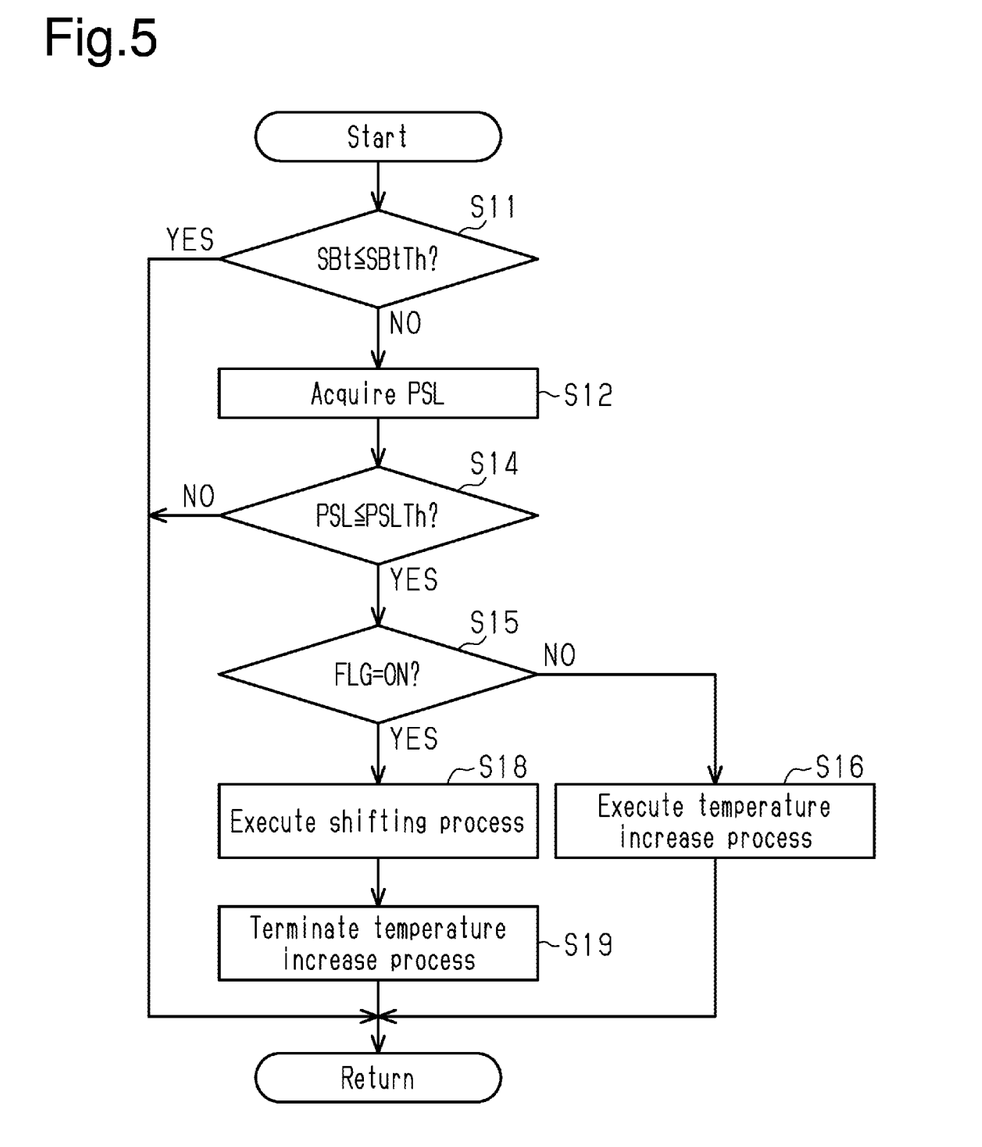
FIG. 5 is a flowchart showing the routine executed by a control section of the control device in the hybrid vehicle of FIG. 1.

Thus, when the engine temperature increase process is executed as the temperature increase process at step S16 shown in FIG. 5, the shut-off valves 213 and 214 of the connecting device 210 are opened. This causes the high-temperature coolant in the motor coolant circuit 201 to flow into the coolant circuit 51.

When warming up of the internal combustion engine 40 has been completed at this time, the coolant temperature TPWt, which is the temperature of the coolant in the coolant circuit 51, converges in a second temperature range. The second temperature range is the temperature range higher than the first temperature range. Thus, if the shut-off valves 213 and 214 are kept open even after the completion of warming up of the internal combustion engine 40, the temperature of the coolant that flows through the motor coolant circuit 201 becomes higher than the upper limit of the first temperature range. In this case, the function to control the temperature of the battery 22 and the inverter circuit 23 is deteriorated.

For this reason, in the routine shown in FIG. 5, when the engine operation is started by starting the shifting process at step S18, the shut-off valves 213 and 214 of the connecting device 210 are closed at the next step S19. This prevents the coolant in the motor coolant circuit 201 from flowing into the coolant circuit 51. Furthermore, the coolant in the coolant circuit 51 is prevented from flowing into the motor coolant circuit 201. Thus, the temperature of the coolant that flows through the motor coolant circuit 201 during the second drive mode is inhibited from becoming higher than the upper limit of the first temperature range. As a result, the deterioration of the function to control the temperature of the battery 22 and the inverter circuit 23 is avoided.

Modifications

The above-described embodiments may be modified as follows. The above-described embodiments and the following modifications can be combined as long as the combined modifications remain technically consistent with each other.

As long as the charge amount SBt at that time is taken into consideration, the first upper limit calculation section 83 may calculate the upper limit motor output PML without taking into consideration the battery temperature TPBt.

As long as the charge amount SBt at that time is taken into consideration, the first upper limit calculation section 83 may calculate the upper limit motor output PML without taking into consideration the inverter temperature TPIn.

The engine heating section may increase the temperature of liquid other than the coolant. For example, the engine heating section may increase the temperature of oil that circulates in the internal combustion engine 40. In this case, the heater may be located in the oil pan, and the heater may function as the engine heating section.

As long as the catalyst heating section 46 is provided, the engine heating section may be omitted. In this case also, the upper limit engine output PEL is increased by increasing the catalyst temperature TPCa by executing the catalyst temperature increase process as the temperature increase process.

The case in which the engine temperature increase process is not executed as the temperature increase process, or the case in which the internal combustion engine 40 does not include the engine heating section will be considered. In these cases, when the upper limit engine output PEL is calculated, the coolant temperature TPWt, the oil temperature TPOl, the temperature TPCy of the combustion chambers, and the wall temperature TPPo of the intake ports do not necessarily have to be taken into consideration.

The internal combustion engine 40 does not necessarily have to include the catalyst heating section 46. Moreover, the internal combustion engine 40 does not necessarily have to include the catalyst heating section 46 or the engine heating section 56. In this case, the temperature increase process cannot be executed. Thus, when the upper limit system output PSL becomes lower than or equal to the startup determination output PSLTh under the condition in which the first drive mode is selected, the engine operation is started by executing the shifting process.

The hybrid system 20 may have any structure as long as the internal combustion engine 40 and the electric motor 21, which function as a power source of the vehicle, are included. For example, the system disclosed in Japanese Laid-Open Patent Publication No. 2008-106675 may be employed as the hybrid system 20. The system is provided with a motor generator that generates electric power using the output torque of the internal combustion engine. In this system, although the upper limit system output PSL increases as the sum of the upper limit engine output PEL and the upper limit motor output PML is increased, the upper limit system output PSL is not necessarily equal to the sum.

The system disclosed in Japanese Laid-Open Patent Publication No. 2017-159680 may be employed as the hybrid system 20. In this system, even during the operation of the engine, the output torque of the internal combustion engine can be prevented from being input to the wheels 11. Thus, the upper limit system output PSL becomes equal to the sum of the upper limit engine output PEL and the upper limit motor output PML.

The control device 80 is not limited to one that performs software processing on all processes executed by itself. For example, the control device 80 may be equipped with a dedicated hardware circuit (e.g., application specific integrated circuit: ASIC) that performs hardware processing on at least some of the processes to be executed by itself. That is, the control device 80 may be configured as (i) one or more processors that operate in accordance with a computer program (software), (ii) one or more dedicated hardware circuits that execute at least some of the various processes, or (iii) circuitry including combinations thereof. The processor includes a CPU and memories such as a RAM and a ROM, and the memory stores program codes or instructions configured to cause the CPU to execute the processing. The memories, that is, computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A control device for a hybrid vehicle, wherein the hybrid vehicle includes a hybrid system including an internal combustion engine and an electric motor as power sources of the hybrid vehicle, the control device comprising:
a control circuitry configured to
shift a drive mode from a first drive mode to a second drive mode when a charge amount of a battery for the electric motor becomes smaller than or equal to a determination charge amount under a condition in which the first drive mode is selected as the drive mode of the hybrid vehicle, in the first drive mode, operate the electric motor to drive the hybrid vehicle while the internal combustion engine is stopped, and in the second drive mode, drive the hybrid vehicle while permitting an operation of the internal combustion engine;

a first upper limit calculation circuitry configured to calculate an upper limit motor output, which is an upper limit of an output of the electric motor, wherein the upper limit motor output is calculated such that the greater the charge amount of the battery is, the greater a value of the upper limit motor output becomes;

a second upper limit calculation circuitry configured to calculate an upper limit engine output, which is an upper limit of an output of the internal combustion engine, wherein the internal combustion engine includes an exhaust passage and a catalyst located in the exhaust passage, and the upper limit engine output is calculated such that a value of the upper limit engine output is higher when a temperature of the catalyst is within an activation temperature range of the catalyst than when the temperature of the catalyst is out of the activation temperature range, wherein the upper limit engine output refers to the upper limit of the engine output that keeps properties of exhaust gas discharged from the hybrid vehicle within a permissible range; and a third upper limit calculation circuitry configured to calculate an upper limit system output, which is an upper limit of an output of the hybrid system when the first drive mode is selected, wherein the upper limit system output is calculated such that the greater a sum of the upper limit motor output and the upper limit engine output is, the greater a value of the upper limit system output becomes, wherein the control circuitry is configured to execute a shifting process when the upper limit system output is lower than or equal to a startup determination output even under a condition in which the charge amount of the battery is greater than the determination charge amount, and the shifting process shifts the drive mode to the second drive mode to start the internal combustion engine.

2. The control device for a hybrid vehicle according to claim 1, wherein the hybrid vehicle includes a catalyst heating section, which is configured to increase the temperature of the catalyst, and the control circuitry is configured to execute a catalyst temperature increase process when the upper limit system output becomes lower than or equal to the startup determination output under the condition in which the charge amount of the battery is greater than the determination charge amount, wherein the catalyst temperature increase process increases the temperature of the catalyst by operating the catalyst heating section, and execute the shifting process when the upper limit system output becomes lower than or equal to the startup determination output even though the catalyst temperature increase process is executed.

3. The control device for a hybrid vehicle according to claim 1, wherein the second upper limit calculation circuitry is configured to increase the upper limit engine output as a temperature of liquid that circulates in the internal combustion engine is increased.

4. The control device for a hybrid vehicle according to claim 3, wherein the hybrid vehicle includes an engine heating section, which is configured to increase the temperature of the liquid that circulates in the internal combustion engine, and the control circuitry is configured to execute an engine temperature increase process when the upper limit system output becomes lower than or equal to the startup determination output under the condition in which the charge amount of the battery is greater than the determination charge amount, wherein the engine temperature increase process increases the temperature of the liquid by operating the engine heating section, and execute the shifting process when the upper limit system output becomes lower than or equal to the startup determination output even though the engine temperature increase process is executed.

5. The control device for the hybrid vehicle according to claim 1, wherein the first upper limit calculation circuitry is configured to calculate the upper limit motor output based on a temperature of the battery and a temperature of an inverter circuit for the electric motor in addition to the charge amount, and the first upper limit calculation circuitry is configured to increase the upper limit motor output as the temperature of the battery is increased, and to increase the upper limit motor output as the temperature of the inverter circuit is increased.

6. A method for controlling a hybrid vehicle, wherein the hybrid vehicle includes a hybrid system including an internal combustion engine and an electric motor as power sources of the hybrid vehicle, the control method comprising:

driving the hybrid vehicle in a first drive mode by operating the electric motor while the internal combustion engine is stopped;

driving the hybrid vehicle in a second drive mode by driving the hybrid vehicle while permitting an operation of the internal combustion engine;

shifting a drive mode from the first drive mode to the second drive mode when a charge amount of a battery for the electric motor becomes smaller than or equal to a determination charge amount under a condition in which the first drive mode is selected as a drive mode of the hybrid vehicle;

calculating an upper limit motor output, which is an upper limit of an output of the electric motor, wherein the upper limit motor output is calculated such that the greater the charge amount of the battery is, the greater a value of the upper limit motor output becomes;

calculating an upper limit engine output, which is an upper limit of an output of the internal combustion engine, wherein the internal combustion engine includes an exhaust passage and a catalyst located in the exhaust passage, and the upper limit engine output is calculated such that a value of the upper limit engine output is greater when a temperature of the catalyst is within an activation temperature range of the catalyst than when the temperature of the catalyst is out of the activation temperature range, wherein the upper limit engine output refers to the upper limit of the engine output that keeps properties of exhaust gas discharged from the hybrid vehicle within a permissible range;

calculating an upper limit system output, which is an upper limit of an output of the hybrid system when the first drive mode is selected, wherein the upper limit system output is calculated such that the greater a sum of the upper limit motor output and the upper limit engine output is, the greater a value of the upper limit system output becomes; and executing a shifting process when the upper limit system output is lower than or equal to a startup determination output even under a condition in which the charge amount of the battery is greater than the determination charge amount, wherein the shifting process shifts the drive mode to the second drive mode to start the internal combustion engine.

7. A non-transitory computer-readable recording medium storing a program for causing a processor to execute a control process of a hybrid vehicle, wherein the hybrid vehicle includes a hybrid system including an internal combustion engine and an electric motor as power sources of the hybrid vehicle, the control process including:

driving the hybrid vehicle in a first drive mode by operating the electric motor while the internal combustion engine is stopped;

driving the hybrid vehicle in a second drive mode by driving the hybrid vehicle while permitting an operation of the internal combustion engine;

shifting a drive mode from the first drive mode to the second drive mode when a charge amount of a battery for the electric motor becomes smaller than or equal to a determination charge amount under a condition in which the first drive mode is selected as a drive mode of the hybrid vehicle;

calculating an upper limit motor output, which is an upper limit of an output of the electric motor, wherein the upper limit motor output is calculated such that the greater the charge amount of the battery is, the greater a value of the upper limit motor output becomes;

calculating an upper limit engine output, which is an upper limit of an output of the internal combustion engine, wherein the internal combustion engine includes an exhaust passage and a catalyst located in the exhaust passage, and the upper limit engine output is calculated such that a value of the upper limit engine output is greater when a temperature of the catalyst is within an activation temperature range of the catalyst than when the temperature of the catalyst is out of the activation temperature range, wherein the upper limit engine output refers to the upper limit of the engine output that keeps properties of exhaust gas discharged from the hybrid vehicle within a permissible range;

calculating an upper limit system output, which is an upper limit of an output of the hybrid system when the first drive mode is selected, wherein the upper limit system output is calculated such that the greater a sum of the upper limit motor output and the upper limit engine output is, the greater a value of the upper limit system output becomes; and executing a shifting process when the upper limit system output is lower than or equal to a startup determination output even under a condition in which the charge amount of the battery is greater than the determination charge amount, wherein the shifting process shifts the drive mode to the second drive mode to start the internal combustion engine.

\* \* \* \* \*